United States Patent
Kretchman

[15] 3,684,096
[45] Aug. 15, 1972

[54] EXPANDABLE SPIRAL FILTER

[72] Inventor: Gerald L. Kretchman, Stevensville, Mich.

[73] Assignee: Whirlpool Corporation, Benton Harbor, Mich.

[22] Filed: Sept. 24, 1970

[21] Appl. No.: 75,139

[52] U.S. Cl. ................................210/356, 210/411
[51] Int. Cl. .............................................B01d 35/22
[58] Field of Search..............210/304, 336, 356, 411

[56] References Cited

UNITED STATES PATENTS 3,429,444   2/1969   Spiegel et al. ..............210/356

Primary Examiner—J. L. DeCesare
Attorney—James S. Nettleton, Thomas E. Turcotte, Donald W. Thomas, Gene A. Heth, Franklin C. Harter, Anthony Niewyk, Robert L. Judd and Hill, Sherman, Meroni, Gross & Simpson

[57] ABSTRACT

A filter or trap especially adapted for removing lint and other foreign material from a liquid, such as wash water in an automatic domestic washing machine having wash and drain cycles, includes a circular flow path along a housing surface, and a generally spiral segment flexible filter element cooperates with said surface responsive to the liquid flowing in one direction to close in filtering relation toward the surface and movable into spaced flushing relation to the surface during reverse flow of the liquid. By anchoring the filter element adjacent a port from which filtered liquid passes in operation, the element controls the liquid flow compelling substantially all of the liquid to traverse the filter before reaching the port. Conversely, liquid entering the housing through such port is compelled to sweep the filter element in flushing, cleaning relation.

13 Claims, 7 Drawing Figures

PATENTED AUG 15 1972 3,684,096

INVENTOR.
GERALD L. KRETCHMAN

BY Kiel, Sherman, Meroni, Gross & Simpson ATTORNEYS

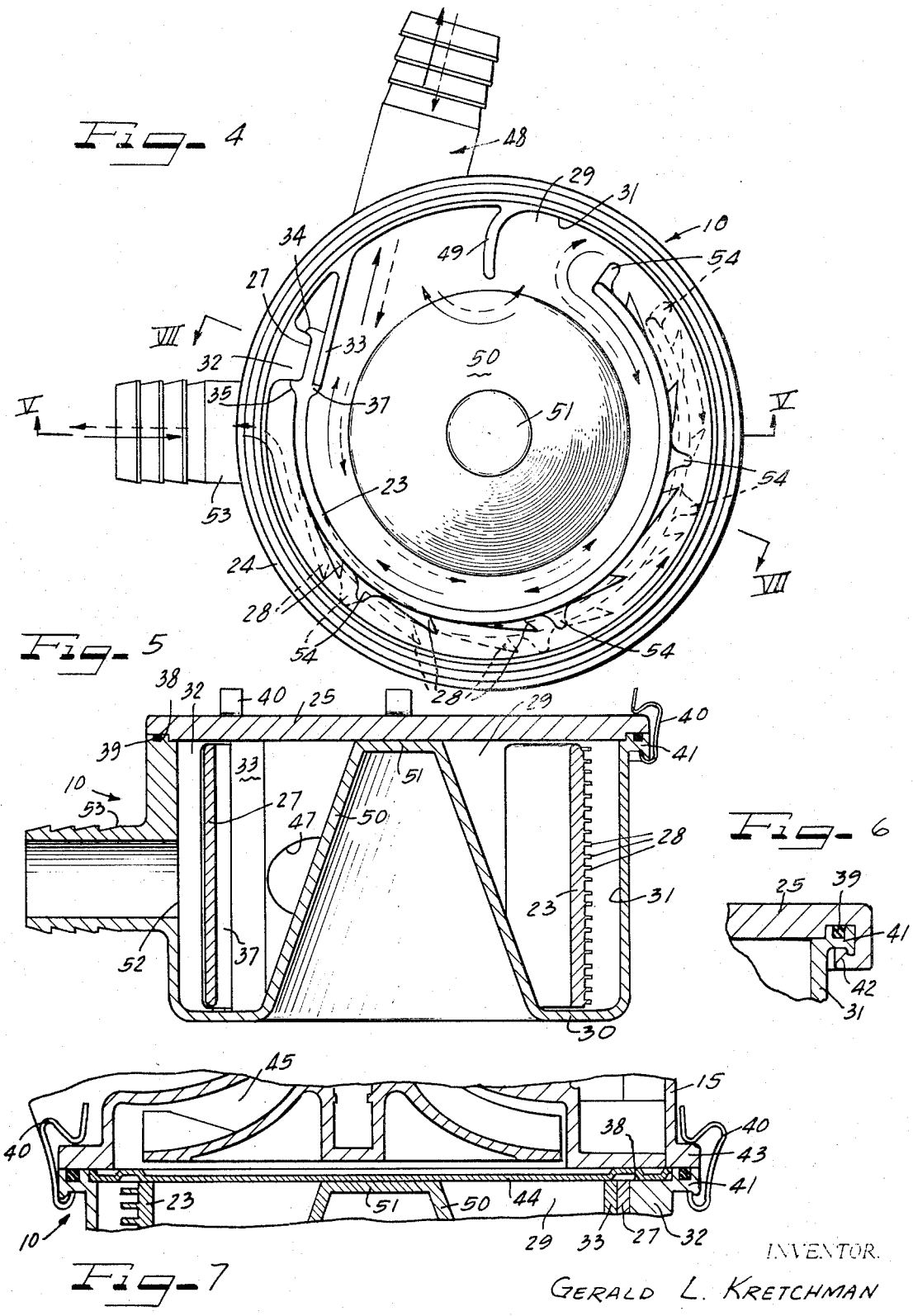

EXPANDABLE SPIRAL FILTER

This invention relates generally to filtering apparatus, and is more particularly concerned with a self-cleaning unit which is especially adapted for use with automatic domestic washing machines having wash and drain cycles.

Filtering of lint and other foreign matter from wash water in domestic washing machines has presented a major problem. Various filtering and lint trapping arrangements have heretofore been proposed. Some of them have been less efficient than desirable and liable to clogging, uneven separation of lint from the wash water, necessity for manual clean-out, limited capacity, and the like. Others have been fairly efficient, but have been more bulky than desirable, sometimes more complex, and generally have involved cost factors which should desirably be reduced.

An important object of the present invention is to provide a new and improved automatic, self-cleaning lint and dirt filter or trap which is free from and overcomes deficiencies of prior devices, is simple and rugged in construction, attains substantial economies in manufacturing costs, and is highly efficient for the intended purpose.

Another object of the invention is to provide a new and improved filter of the character indicated which is unusually compact but highly efficient and capable of handling a relatively large volume of liquid therethrough with large filtering capacity.

A further object of the invention is to provide a new and improved filter which functions in a continuous flow path wherein it provides for the progressive removal of foreign matter such as lint.

Still another object of the invention is to provide a new and improved filter or trap of the character indicated in which the filtering element is efficiently responsive to liquid flow as well as pressure.

A still further object of the invention is to provide a new and improved filter unit of the character indicated which is adapted to be constructed from molded copolymer plastic parts arranged for quick and easy assembly.

A yet further object of the invention is to provide a new and improved filter assembly of the character indicated which is operable with predictable efficiency, uniformity and reliability.

Other objects, features and advantages of the invention will be readily apparent from the following description of certain preferred embodiments thereof, taken in conjunction with the accompanying drawings, although variations and modifications may be effected without departing from the spirit and scope of the novel concepts embodied in the disclosure, and in which:

FIG. 4 is a top plan view of a filter unit showing the filter element in place therein and with the cover removed from the housing of the unit;

FIG. 5 is a diametric sectional detail view taken substantially along the line V—V of FIG. 4;

FIG. 6 is a fragmentary sectional detail view illustrating a modified attachment of the cover; and FIG. 7 is a fragmentary sectional detail view taken substantially along the line VII—VII of FIG. 4 but showing the filter unit attached to the pump in the associated flow circuitry.

Figure 1:
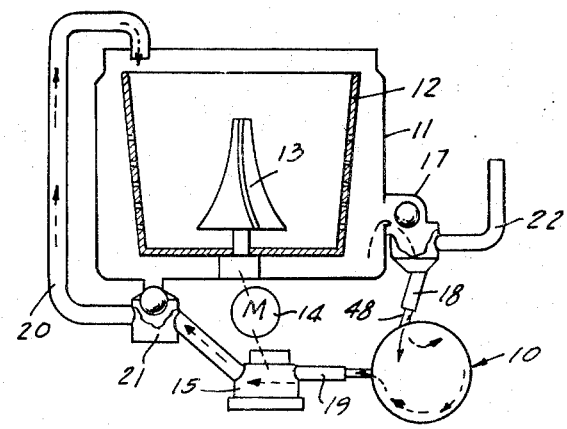
FIG. 1 is a schematic view of an automatic clothes washing machine showing the flow circuitry associated therewith including a filter unit embodying features of the invention, the direction of flow being indicated as during the wash cycle.

Illustrative of a domestic clothes washing machine system in which a lint filter or trap 10 embodying features of the invention is adapted to be used, FIG. 1 depicts a tub 11 having mounted therein a spin dry basket 12 and an agitator 13 operatively connected to a driving motor 14. Also driven by the motor 14 is a reversible circulating pump 15. Wash water is supplied to the tub 11 in any suitable manner and by any suitable means, not shown.

At any desirable time in the wash cycle, or continuously during such wash cycle, the wash water is circulated by action of the pump 15 as indicated by directional flow arrows in FIG. 1. During such flow, the water leaves the lower portion of the tub 11 through a check valve 17 and passes by way of a duct 18 into the filter unit 10. Substantially lint-free water passes from the filter 10 through a duct 19 to the pump 15, whence it is conducted through a return duct 20 to the tub 11.

Figure 2:
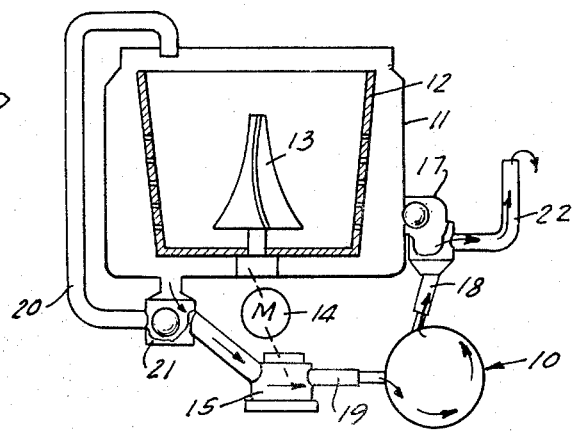
FIG. 2 is a similar schematic view showing the direction of flow during a drain cycle.

At conclusion of the wash cycle, the laundry machine is operated in a drain and spin dry cycle, during which the pump 15 is reversed, whereby a check valve 21 effects communication between the bottom of the tub 11 with the delivery duct 20 adjacent the pump 15, the reverse action of which operates to drain the tub, as indicated by directional flow arrows in FIG. 2, and sends the drain water through the duct 19 into the filter 10, acting automatically to flush lint from the filter. Thence, the drain water and flushed lint pass on through the duct 18 and past the check valve 17 into a drain outlet 22.

According to the present invention, the filter unit 10 comprises a compact, generally circular, fairly flat, automatic liquid flow and pressure responsive unit. In an efficient and economical form, the filter comprises economically manufactured molded or cast parts which are desirably made from suitable copolymer materials, namely, a filter element 23 made from a filled nylon material such as may be obtained in the market under the trademark NYLATRON, a housing 24 and a cover 25, both the latter of which may be made from molded or cast acrylic materials such as may be obtained on the market under the trademark PLEXIGLAS.

The construction and relationship of the filter member 23 and the housing 24 are such that they provide a relatively restricted flow path in one direction through the housing wherein filtering means on at least one of the members are operative to trap and hold solids such as lint and other foreign materials carried by the liquid, while the flow path is opened during flow of the liquid in the opposite direction and the material flushed and cleaned from the filtering structure. In a desirable construction, the filter member 23 is in the form of a resiliently flexible elongated tongue-like, curved, spiral segment panel having means at one end thereof comprising an anchoring flange structure 27 relative to which the remainder of the filter member is resiliently spirally flexible within relatively narrow but adequate range for the intended purpose. On its convex face, the filter member 23 is provided with filter means in the form of a series of groups of filter teeth 28 disposed in material-catching relation across the band width of the member. Desirably each group of the teeth 28 is in a row across the band width, with the successive rows located as closely contiguous as practicable but with sufficient space between the adjacent rows to enable a high material retaining capacity without overloading and clogging fluid flow which might place the pumping equipment under strain or induce cavitation. All of the teeth 28 may be of substantially the same general shape, namely, of irregular triangular outline with points oriented toward the direction from which the liquid bearing lint or other solid material to be filtered is circulated through the filter unit, and conversely pointing in the direction in which flushing liquid moves through the unit. In each row the thickness of the respective teeth is desirably no greater than and preferably less than the space between adjacent teeth. For filtering efficiency, the several rows of the teeth 28 considered progressively from the anchor flange 27, are desirably of diminishing number but the same height, so that as liquid advances through the teeth starting at the free end of the filter member 23 progressively smaller particles of foreign material and more particularly lint from wash water, are trapped and held. For example, where the filter member 23 comprises a panel about 2.75 inches wide, having a wall thickness of about 0.100 inch and the member being formed on about a 2 inches radius, with the tips of the teeth nearest the anchor flange 27 spaced about 60° therefrom, and the tips of the successive rows of teeth spaced about 30° apart, with seven rows of the teeth, each tooth being about 0.030 inch in width, the spacing between teeth may be about 0.040 inch in the row of teeth nearest the anchor flange and with the spacing wider by about 0.010 inch in each successive row therebeyond to a width of about 0.100 inch in the row nearest the free end of the member. In this arrangement, there are desirably 37 teeth in the row nearest the anchor flange, 33 teeth in the next succeeding row, then 29 teeth, following that 26 teeth succeeded by 24 teeth, next to last 22 teeth and in the last row 20 teeth.

Figure 3:
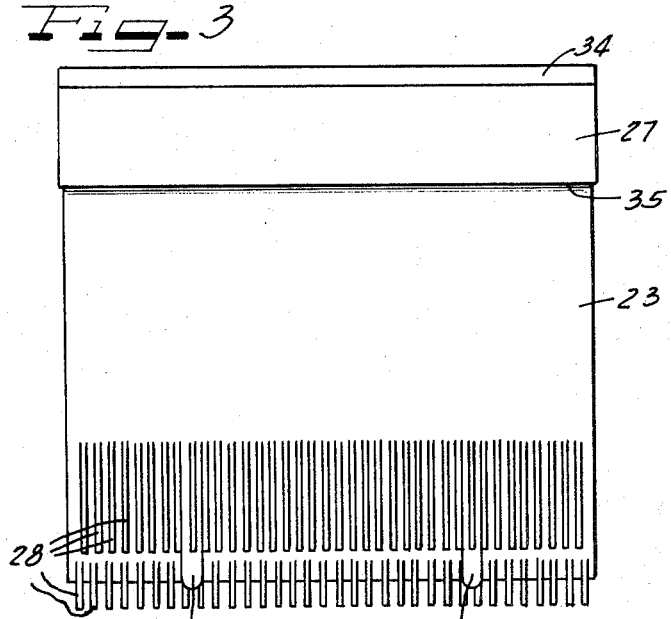
FIG. 3 is an elevational view of a filter element according to the invention.

To house and cooperate with the filter member 23, the housing 24 comprises a generally cup-shaped member providing a filter or trap chamber 29 therein defined by a bottom wall 30 and a cylindrical wall 31. Mounting of the filter member 23 within the chamber is such that the convex face of the member normally opposes the cylindrical wall 31 in generally concentric relation with the teeth 28 spaced substantially from the cylindrical wall surface, substantially as shown in FIG. 5. For this purpose, means are provided within the chamber to receive the anchoring flange 27 fixedly in the assembly in an interlocked relationship, conveniently comprising an axially extending rib 32 integral with the wall 31 and providing a spacer confronting a generally axially extending retaining flange 33 defining therewith a slot opening in circumferential direction and from the open end of the chamber and within which the anchoring flange 27 is received slidably by insertion in the axial direction from the open end of the chamber. To retain the member 23 against circumferential displacement it is provided with interlock means in the form of spaced rib flanges 34 and 35 to engage the opposite sides of the spacer rib 32, while for stability a rib flange 37 on the opposite face of the member 23 from the rib flange 35 is provided to engage the adjacent edge of the retaining flange 33. For insuring freedom of flexing movement of the filter member 23 in generally radial direction relative to the wall 31 and to avoid any binding of the respective opposite edges of the member 23 with the bottom wall 30 or the cover 25 when applied in closing relation to the open end of the housing, the anchoring flange 27 is desirably slightly wider at each edge, as best seen in FIG. 3 to provide spacing means which will cooperate with the bottom wall and the cover to hold the member 23 in substantially centered equally, slightly clearance spaced relation at its edges as best seen in FIG. 5.

Slidable displacement of the anchoring flange 27 is prevented by the cover 25 which in the assembly bears against the adjacent edge of the flange 27 and the ends of the rib 32 and the flange 33 and seats on the rim of the housing 24 which is provided with an annular rabbet groove 38 to receive a compementary shoulder of the cover for centering with an annular sealing ring 39 maintaining a sealed joint between the cover and the housing. Means for securing the cover 25 in sealed engagement with the rim of the housing may comprise retaining spring clips 40 where it is desirable to enable removal of the cover 25 for access into the housing for any purpose such as clean-out and the like. For this purpose the rim of the housing is provided with a radial attachment flange 41. Where it is desired to have the cover 25 permanently secured to the housing, the arrangement of FIG. 6 may be employed wherein the margin of the cover is turned under into a spin welded flange 42 in engagement about and under the rim flange 41.

If preferred, the filter 10 may be mounted directly on and with the pump 15 as shown in FIG. 7. Desirably, assembly of the filter and pump may be effected by connecting the rim flange 41 in confronting relation to a base rim flange 43 on the pump housing casing, with a partition plate 44 marginally engaged in the rabbet groove 38 and clamped therein by the confronting edge of the pump housing to separate the working chamber of the filter 29 from the hollow interior of the pump casing which provides a pump impeller chamber 45. Separable assembly of the filter and pump is adapted to be effected by means of the clips 40.

Operation of the filter 10 is in response to liquid flow therethrough, wherein the filtering element 23 automatically assumes a liquid filtering position in cooperation with the housing wall 31 in response to liquid flow and pressure differential in one direction through the chamber 29 and assumes a self-cleaning position spaced from the wall 31 automatically when the liquid flows in the opposite direction through the chamber 29. During a filtering cycle, as for example in the washing flow circuit represented in FIG. 1, the liquid, i.e., water, to be cleaned enters the chamber 29 through a port 47 (FIG. 5) in the wall 31 located adjacent to the retaining flange 33 and generally directed toward the anchored end portion of the curved filtering element 23 so that the force of the entering liquid will be impressed upon the concave surface of the filtering element. To facilitate attachment of the duct 18 in communication with the port 47, especially where the latter is a piece of flexible tubing, a nipple 48 is provided integral with and projecting outwardly from the wall 31.

Liquid entering the filter chamber 29 through the port 47 follows generally the flow pattern indicated by the dashed directional flow arrows shown in FIGS. 1 and 4. To assure efficient pressure of the in-flowing liquid from the port 47 against the filtering element 23 to deflect it flexibly toward the wall 31, means are provided including a baffle flange 49 formed integrally on the wall 31 to project inwardly between the port 47 and the free end of the filtering element 23, and more particularly the filtering path between the filtering element and the wall 31 and leaving a large gap for entry of the liquid into the filtering path. Additional means enhancing the efficient filtering member deflecting pressure of the liquid to be cleaned comprise a central guide surface structure within the chamber 29 desirably in the form of a frusto-conical projection integral with and extending from the wall 30 to the cover-closed end of the filter housing where a flat crown 51 confronts the filter chamber cover. By construction of the structure 50 as a hollow thin wall extension of the bottom wall 30, minimum material is required and lightweight of the unit enhanced. In addition to its flow controlling and velocity enhancing function, the structure 50 minimizes the volume of liquid within the chamber 29 at any time.

Connection of the chamber 29 with the duct 19, effecting communication with the pump 15, is through a port 52 in the wall 31 adjacent to the anchoring rib 32 which thus functions as a baffle cooperating with the anchored end portion of the filtering member 23 to close the end of the flow path between the filtering element 23 and the wall 31 so that all liquid passing through the port 52 must also pass through this flow path. To facilitate connection with the duct 19, an attachment nipple 53 extends from the port 52 integrally outwardly from the wall 31. Through this arrangement, liquid to be cleaned entering the chamber 29 under the suction created by the pump 15 forces the filtering member 23 toward the wall 31 to minimize the flow path gap therebetween, whereby foreign material and particularly lint catches on and is retained by the successive rows of filtering teeth 28 as the liquid progresses through the flow path to the port 52 under the pressure differential effected by the pump. During a flushing cycle, reversal of the pump 15 causes the liquid to travel as indicated in full line flow arrows in FIGS. 2 and 4, causing the filtering member 23 to flex away from the wall 31 and open the gap therebetween and permitting the flushing liquid to sweep the material from the filtering teeth 28 which are efficiently pointed downstream considered from the flushing flow direction and upstream relative to the filtering flow direction. As the flushing liquid leaves the path between the filtering member 23 and the wall 31, at least some of the flushing liquid is deflected by the baffle 49 to flush the inside, concave surface of the filtering member 23 and the chamber area between the filtering member and the control cone structure 50.

In order to maintain and enhance filtering efficiency of the teeth 28 means are desirably provided to maintain the sharp pointed tips of the teeth against being dulled by impact against the wall 31, and also to effect a progressively decreased spacing of the teeth tips from the wall 31 from the free end of the filtering member 23 toward the anchored end. To this end, spacer knobs 54 (FIGS. 3 and 4) are provided at suitable intervals along the length of the convex face of the filtering member 23. As shown, a pair of the spacer knobs 54 is desirably provided integrally with the filtering member 23 between the two rows of the teeth 28 which are nearest the anchoring flange 27, and thereafter respective pairs of the spacer knobs 54 are provided between each two rows of the teeth and a pair of the spacer knobs is located at the free end of the filtering member. Since the heavier foreign material such as lint is engaged by the rows of teeth nearest the free end of the filtering member 23, a slightly greater spacing between the tips of the filtering teeth and the wall 31 is desirable at this end to avoid clogging tendency of the heavier material and therefore the endmost of the spacer knobs 54 are slightly longer than the next succeeding pair of knobs 54, and each succeeding pair of knobs 54 thereafter is progressively shorter so that as the number of teeth increases toward the anchoring end of the filtering member, the tooth tip spacing relative to the wall 31 when the filtering member 23 is fully pushed by liquid pressure and differential against the wall will be progressively less downstream from the entry end of the filtering path.

The filter unit 10 comprises a fully self-contained, compact, lightweight, efficient, effectively sealed assembly which may be either openable or permanently secured as preferred. It is compact in size but of ample capacity and fully automatic. The few and simple parts comprise primarily members that can be cast or molded in the form of relatively thin durable plastic shapes. It is easy and convenient to install by attachment of the ends of the appropriate ducts to the port nipples. It is not dependent upon any particular position since the flow therethrough is controlled and therefore it lends itself readily to ease and convenience of installation.

Although various modifications might be suggested by those versed in the art, I wish to embody within the scope of the patent warranted hereon all such modifications as come within the scope of my contribution to the art.

I claim:

1. A self-cleaning filter comprising: a housing defining a chamber having a wall and a pair of spaced ports for connection of the housing in a circuit wherein liquid to be cleaned will enter the chamber through one of said ports, and flushing liquid will enter the chamber through said other port and leave through said one port; a liquid-responsively deflectable filtering member within said chamber having an end portion anchored to the housing intermediate and separating said ports and having a face operatively confronting said wall to provide a filtering and flushing flow path passage therebetween communicating at its opposite ends with the respective ports; and means operatively disposed along and between said face and said wall for filtering liquid to be cleaned in said passage; the member being deflected toward said wall by the liquid to be cleaned whereby to constrict said passage for effective filtering by said filtering means and being deflectable away from said wall to expand said passage for freer movement of the flushing liquid through said passage along said filtering means to remove filtered material from said filtering means.

2. A filter according to claim 1, in which said housing wall is curved and said member comprises an elongated tongue-like complementary segmental curved resiliently flexible panel.

3. A filter according to claim 2, including anchoring flange means on one end portion of said member, and complementary anchoring means on said housing interengaged with said flange means and located intermediate said ports, the remainder of said panel being freely flexibly deflectable relative to said wall.

4. A filter according to claim 3, said anchoring means comprising a rib and retaining flange structure, said chamber being normally opened at one end, said anchoring flange means being slidably engageable with said rib and retaining flange structure through the open end of said chamber, and a cover for said open end cooperating with said anchoring means to retain said anchoring flange means against unintentional displacement therefrom.

5. A filter according to claim 1, wherein said wall is curved, said member comprising a complementary curved panel anchored at one end with a convex face confronting said wall and a concave surface facing away from said wall, and means in said chamber on said housing for controlling flow of the liquid from said one port toward said concave face for pressing the panel toward said wall.

6. A filter according to claim 5, said controlling means comprising a baffle flange located between said one port and the free end portion of said panel.

7. A filter according to claim 5, in which said housing is of generally cup-shape having a bottom wall from which said first-mentioned wall extends, and said controlling means comprising a projection from said bottom wall.

8. A filter according to claim 7, wherein said housing is a molded plastic shell and said projection is a frusto-conical central hollow structure.

9. A filter according to claim 1, said member comprising an elongated panel having said filtering means thereon comprising a plurality of rows of filter teeth projecting into said passage and with points on said teeth extending in upstream direction relative to the direction of flow of liquid from said one port to said other port, and spacers maintaining said points against engaging said wall and in diminishing spaced relation progressively along said passage from adjacent to said one port to adjacent said other port.

10. A filter according to claim 1, in which said housing is of generally cup-shape with said wall cylindrical with a bottom wall at one end and normally open at the opposite end, said ports opening through said wall adjacent to one another, said member comprising a resiliently flexible elongated curved panel, said housing having means slidably receiving said end portion through said open end, a cover closing said end and retaining said end portion in the anchored position, and means securing said cover in closing relation to said end.

11. A filter according to claim 10, said cover comprising a plate, and said means securing the cover including a pump having an impeller chamber divided from said housing chamber by said plate.

12. A self-cleaning filter or trap, comprising: a housing having a chamber with a pair of spaced ports communicating therewith and including an arcuate surface providing a liquid flow path therealong between said ports; a generally spiral segment flexible filtering element separating said ports and having a surface facing said arcuate surface; and filtering means cooperating with said surface in filtering relation responsive to liquid flowing in one direction from one of said ports toward said path, and the element and its surface being movable into spaced relation to said arcuate surface during reverse flow of liquid from the other of said ports along said path toward said one port and thereby enabling flushing of the filtering means.

13. A filter or trap according to claim 12, including means anchoring said filtering element adjacent to said other port and controlling liquid flow to traverse said path between the filtering element and said surfaces before reaching said other port and compelling liquid entering the chamber through said other port to sweep the filtering means in flushing, cleaning relation.

* * * * *

UNITED STATES PATENT OFFICE
CERTIFICATE OF CORRECTION

Patent No. 3,684,096     Dated August 15, 1972

Inventor(s) Gerald L. Kretchman

It is certified that error appears in the above-identified patent and that said Letters Patent are hereby corrected as shown below:

Claim 1, line 54 after "ports", insert -- and leave through the other of said ports -- .

Signed and sealed this 20th day of March 1973.

(SEAL)
Attest:

EDWARD M. FLETCHER, JR.
Attesting Officer

ROBERT GOTTSCHALK
Commissioner of Patents